United States Patent Office 2,757,485
Patented Aug. 7, 1956

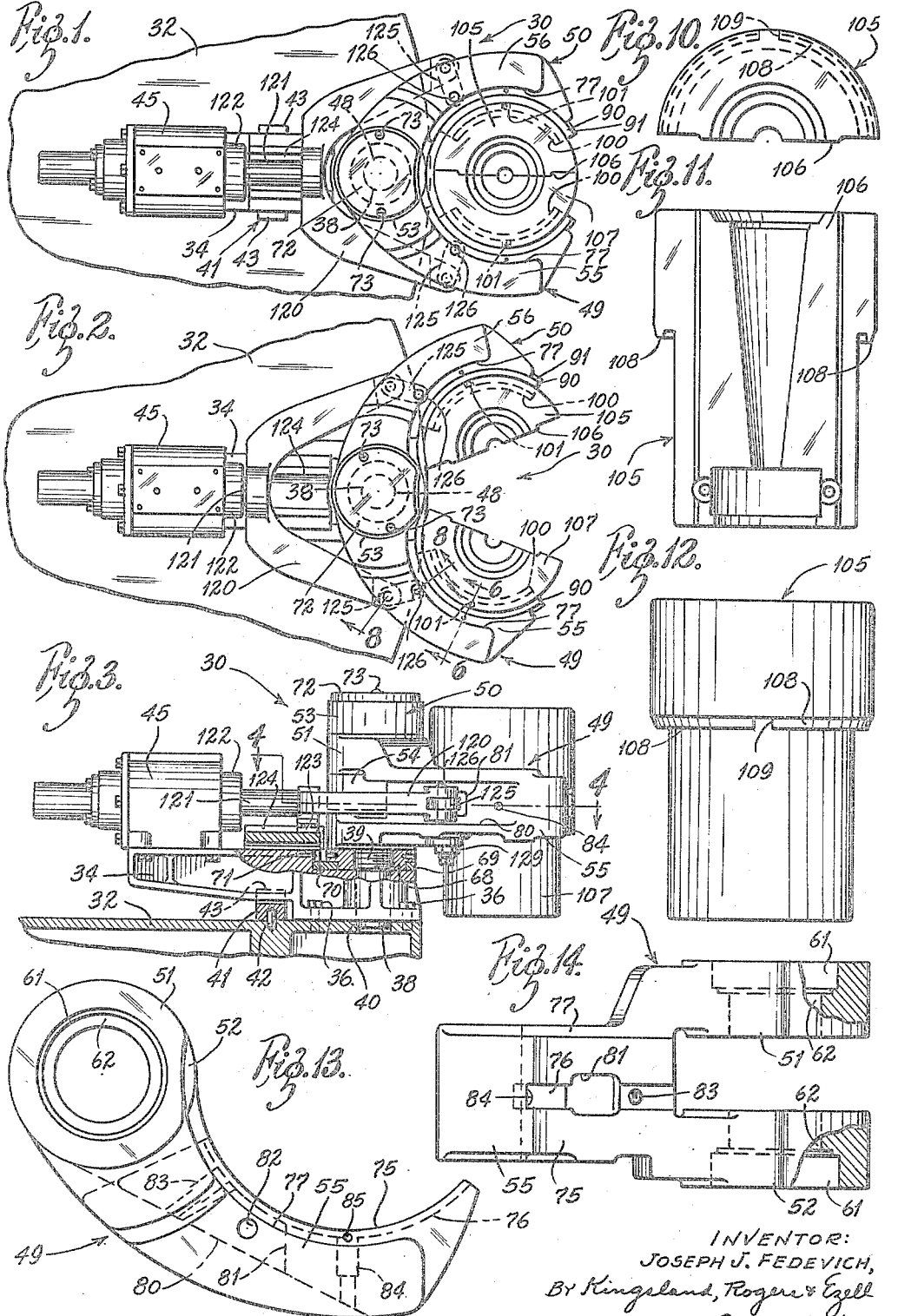

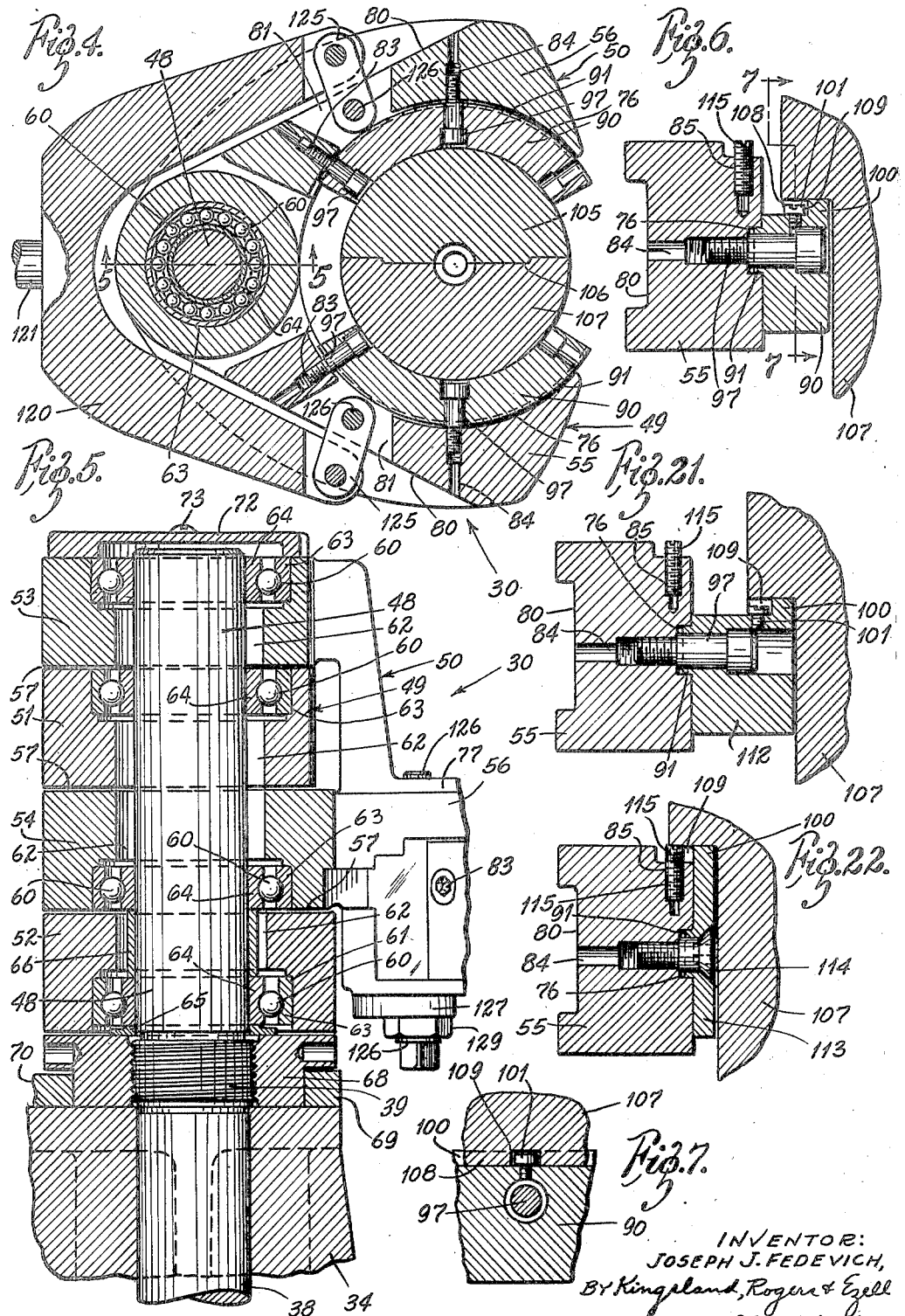

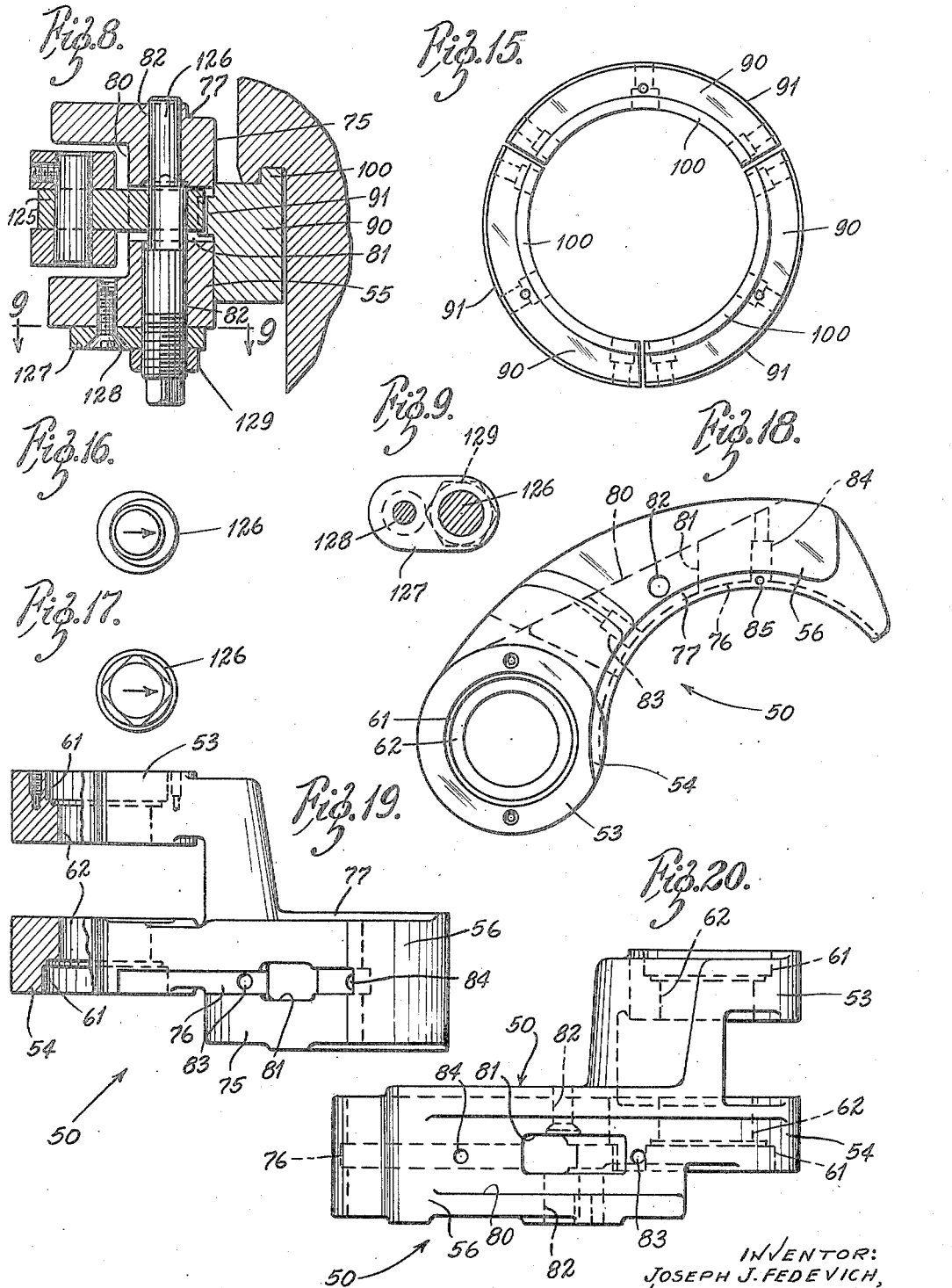

2,757,485

MOLD CARRIER ASSEMBLY

Joseph J. Fedevich, Canton, Ohio

Application October 1, 1952, Serial No. 312,499

4 Claims. (Cl. 49—41)

The present invention relates to glass molds, and more particularly to a mold carrier assembly in which semi-circular mold sections are individually movably supported for opening and closing movement.

The invention here disclosed represents improvements over the mold mechanism which constitutes the subject matter of United States Patent No. 2,538,822, granted to Samuel E. Winder on January 23, 1951. In that patent there is disclosed a mold carrier assembly in which the mold sections are formed with external upper and lower lugs for limited pivotal engagement with vertical pins pressed into laterally pivotable hangers or carriers. Due, however, in large part to the heating effect sustained by both the mold sections and their supporting elements, it has been found desirable to improve the general arrangement by which the mold sections may be supported both to apply a closing pressure which insures full closure of the mold sections upon each other, and to permit a clean withdrawal of the mold sections away from each other without substantial pivotal movement of the sections relative to their supports.

The instant mold carrier assembly, therefore, comprises arcuate adapters removably secured to the mold section carriers and adapted to embrace at least a portion of the outer periphery of the mold sections while supporting the same by interlocking suspension. Added flexibility in the arrangement is attained by substituting adapters of different sizes for mold sections of different external diameters. Not only does the instant arrangement eliminate many elements which are subject to wear in the device of the above-mentioned patent, but it also provides for reduced manufacturing cost due to simplification in the form of the elements which remain.

The foregoing and other advantages will be apparent from the following description, taken in conjunction with the accompanying drawings, in which:

Fig. 1 is a top plan view of a mold carrier assembly incorporating the teachings of the present invention, the assembly being shown with the mold in closed position;

Fig. 2 is a view similar to Fig. 1, but with the mold in open position;

Fig. 3 is a side elevational view, partly in section, of the mold carrier assembly, the mold being again in closed position;

Fig. 4 is a fragmentary sectional plan taken generally along the line 4—4 in Fig. 3;

Fig. 5 is a fragmentary sectional elevation taken generally along the line 5—5 in Fig. 4;

Fig. 6 is a fragmentary sectional elevation taken generally along the line 6—6 of Fig. 2, showing a typical interfitting relationship of a mold section carrier, an adapter, and a mold section;

Fig. 7 is a fragmentary sectional elevation taken generally along the line 7—7 of Fig. 6;

Fig. 8 is a fragmentary sectional elevation taken generally along the line 8—8 of Fig. 2, showing the adjustable interconnection of a yoke and a mold section carrier;

Fig. 9 is a sectional plan taken generally along the line 9—9 of Fig. 8;

Fig. 10 is a top plan view of a removed mold section;

Fig. 11 is a front elevational view thereof;

Fig. 12 is a rear elevational view thereof;

Fig. 13 is a top plan view of a removed left-hand mold section carrier;

Fig. 14 is a side elevational view thereof taken from the upper right of Fig. 13;

Fig. 15 is a plan view of a group of three adapters, shown to illustrate one method of forming the same;

Fig. 16 is a top plan view of a removed eccentric pin;

Fig. 17 is a bottom plan view thereof;

Fig. 18 is a top plan view of a removed right-hand mold section carrier;

Fig. 19 is a side elevational view thereof, partly in section, taken from the lower right of Fig. 18;

Fig. 20 is a side elevational view thereof taken from above Fig. 18;

Fig. 21 is a fragmentary sectional view similar to Fig. 6 but showing an adapter of smaller inside radius; and Fig. 22 is a fragmentary sectional view similar to Fig. 6, but showing an adapter of greater inside radius.

Referring to the drawings more particularly by means of reference numerals, 30 indicates generally a mold carrier assembly incorporating the teachings of the present invention. As shown in Figs. 1 through 3, the assembly 30 is mounted upon a base 32 which may take the form of a rotating table such as that shown in application Serial No. 688,470, filed August 5, 1946, in the name of Samuel E. Winder. On the upper surface of the table 32 there is a bracket or block 34 secured in place by screws 36, and it is this block 34 which provides the direct support for the assembly 30.

Inasmuch as it is extremely desirable that the assembly 30 be accurately located relative to the table 32, means are provided, as will appear, for obtaining and maintaining this proper relation. Thus, the block 34 receives a mold hinge pin 38 having an intermediate threaded section 39. This threaded section 39, however, does not enter the block 34, but is disposed adjacent its upper surface as best shown in Fig. 5. The lower cylindrical portion of the pin 38 does enter the block 34 and passes completely therethrough to engage a hole 40 accurately located in the upper surface of the table 32. By this means the assembly 30 is accurately located upon the table 32. Appropriate alignment of these parts is secured by means of a yoke member 41 accurately located upon the table 32 by a dowel 42 and having upstanding side lugs 43 which engage opposite sides of the block 34. This alignment of the block 34 is carried through by appropriate locating devices of a similar nature to position a pneumatic cylinder 45, forming a part of the mold carrier assembly 30, at the end of the block 34 which is remote from the pin 38 thereby to maintain proper alignment of the assembly 30 relative to the table 34.

Above its threaded section 39 the pin 38 has a cylindrical hinge portion 48 which supports a pair of mold section carriers 49 and 50. These two carriers are opposite in construction, the first one being designated as a left-hand mold section carrier, shown removed in Figs. 13 and 14, and the second one being designated as a right-hand mold section carrier, shown removed in Figs. 18, 19 and 20. As is apparent from the several figures mentioned, aside from being opposite in hand, the two carriers which form a pair differ only in the arrangement of their respective coaxial hinge ears. These hinge ears, which are designated 51 and 52 for the carrier 49 and 53 and 54 for the carrier 50, are substantially identical in size but are offset from respective hanger portions 55 and 56 of the carriers 49 and 50. The coaxial spacing of each pair of ears is the same for each carrier, and as clearly shown in Fig. 5, is such that the two carriers 49 and 50 may be mounted on the hinge portion 48 of the pin 38 so as to dispose the hanger portions 55 and 56 in opposed relation one to the other. It will also be noted from Fig. 5 that the spacing of each pair of ears is such as to leave open spaces 57 between adjacent ears when they are assembled in the illustrated complementary relationship. Means for establishing and maintaining the open spaces 57 will appear.

Each hinge ear 51 through 54 is provided with a ball bearing assembly 60 having its outer race 63 pressed into an appropriate recess 61 in the ear. Each ear is also bored through, as at 62, to provide substantial clearance about the pin 38.

As is now apparent, the several hinge ears 51 through 54, each with its ball bearing assembly 60, are interfitted and slipped onto the hinge portion 48 of the pin 38, the inner races 64 of the ball bearing assemblies 60 being adapted for a snug sliding fit with the pin 38. As will be noted from Fig. 5, a thrust washer 65 underlies the inner race 64 of the ball bearing assembly 60 disposed in the lowermost ear 52 and a tubular spacer 66 is interposed between the inner races 64 of the ball bearing assemblies 60 in the two lowermost ears 52 and 54. It is, of course, obvious that the spacer 66 maintains an appropriate separation between these two ball bearing assemblies 60, and hence between the ears 52 and 54 so as to establish and maintain the open spaces 57 between all adjacent ears of the group. Underlying the thrust washer 65 there is an adjusting collar 68 which threadedly engages the section 39 of the pin 38. It may readily be seen, therefore, that rotation of this collar 68 effects vertical adjustment of the assembled carriers 49 and 50. A split ring 69 engages the lower part of the collar 68 and has a projection 70 which engages a notch 71 in the block 34. The split ring 69 is thus restrained from rotating and is provided with a screw (not shown) for clamping it around the collar 68, thereby to maintain the latter along with the carriers 49 and 50 in appropriate adjusted position.

The topmost hinge ear 53 assembled on the pin 38 receives a cover plate 72 secured by screws 73.

Considering the hanger portions 55 and 56 of the respective carriers 49 and 50, it will be seen that these portions are substantially identical except for being opposite in hand. Thus, each of the portions 55 and 56 is generally arcuate in form and has an inner vertical surface 75 formed to a circular arc. Each of the surfaces 75 has a groove 76 therein. Above the surfaces 75 each of the hanger portions is cut back, as at 77, to an arcuate form which is concentric with both the surfaces 75 and the grooves 76. It will be noted that the surfaces 75 extend arcuately from the outer or free ends of the hanger portions to a point of tangency with the hinge ear portions of the carriers and that both the grooves 76 and the cut-back elements 77 are carried through those hinge portions which are in line therewith. This has the effect of leaving indentations in certain of the ear portions as clearly shown in Figs. 1 through 3 and 5, as well as in Figs. 13 and 18 which show plan views of these removed parts. Thus, it will be noted, particularly in Fig. 5, that the hinge ears 51 and 53 are each cut back or indented to provide radial clearance equal to that of the set-back portions 77. It is clear then that this arcuate radial clearance extends from the topmost surface of the assembled carriers 49 and 50 down to the level of the upper edge of the vertical surfaces 75. From this point downward, the clearance corresponds to the radius of the surfaces 75. It will be noted (Figs. 1–3, and 5) that the cover plate 72 is also shaped for conformance with the indentation in the hinge ear 53 to which it is attached.

On the side opposite the surface 75, each of the hanger portions 55 and 56 has a cut-out portion or recess 80 that extends substantially from the area of the hinge ears until it runs out near the free end of the hangers. Intersecting this recess 80 there is an angular opening 81 that connects from the recess 80 through to the surface 75. This opening 81 is intersected by a vertical opening 82 which is reduced in diameter above the opening 81, as best shown in Figs. 8 and 20.

Each of the hanger portions 55 and 56 has a pair of horizontal holes 83 and 84 which intersect the grooves 76 and extend radially therefrom through to the recess 80. The inner ends of the holes 83 and 84 are threaded. A vertical hole 85, also threaded, is formed downwardly from the ledge adjacent the top edge of the surface 75.

As best shown in Figs. 4 and 6, each of the carriers 49 and 50 is provided with a replaceable adapter, such as the one designated 90 in these two figures. The adapters, such as 90, are formed arcuately to fit the surfaces 75 of the hanger portions 55 and 56 and have lug portions 91 which interfit with the grooves 76. They are firmly secured to the carriers by means of bolts or screws, such as 97, extending therethrough to engage the threaded openings 83 and 84 in the hanger portions 55 and 56. It will be noted that the holes in the adapters are counterbored to receive the heads of the attaching screws. The adapters, such as 90, are preferably fabricated in multiples of three as illustrated in Fig. 15, wherein it is apparent that an appropriately shaped and drilled ring-like member may be cut into segments of substantially one hundred and twenty degrees to form three individual adapters, such as 90.

An upstanding arcuate lug 100 is formed at the top inner edge of each adapter. Immediately in back of this lug 100 and midway of the extremities thereof there is provided a headed screw 101.

Each adapter, such as 90, is adapted to interfit with and to support an appropriate mold section, such as 105, shown in Figs. 10, 11 and 12 of the drawings. The illustrated mold section 105 is a male section, as is evident from the offset portion 106 thereon, and interfits with a complementary female mold section, such as 107 (Figs. 1, 2, 3 and 4), which is provided with appropriate recesses to receive the offset portions 106 of the mold sections 105. It will be noted that the mold sections, such as 105 and 107, are generally semi-cylindrical and have their upper portions of greater diameter than their lower portions. Depending arcuate lugs, such as 108, are provided adjacent the intersection of these upper and lower diameters and are separated to form slots 109 therebetween. The interfitting relationship between a mold section, such as 105, and an adapter, such as 90, is clearly shown in Figs. 6 and 7 wherein it is apparent that the lugs 100 and 108 of these members are interlocked, with the screw 101 occupying the slot 109.

Clearly, the present arrangement admits the alternative use of mold sections having diameters either greater or smaller than those of the illustrated mold sections 105 and 107. Thus, Fig. 21 illustrates the use of an adapter 112 which differs from the adapter 90 only in its radial depth. Fig. 22 illustrates the arrangement in which the maximum size mold section to be accommodated is shown. In the arrangement of Fig. 22, an adapter 113 of minimum radial depth is provided with a countersunk opening to receive a special screw 114. It will further be noted that the plate-like section of the adapter 113 is extended upwardly above the upper edge of the surface 75 so as to form a lug 100 adjacent this upper edge. In this arrangement, a setscrew 115 inserted in the hole 85 of the carriers 49 and 50 engages the notch 109 in the mold section.

The two carriers 49 and 50, and hence the several elements supported thereby, are driven by a yoke member 120. This yoke member is integrally formed with a piston rod 121 that passes through a packing gland 122 of the cylinder 45 mounted on the inner end of the bracket 34.

The motor 45 operates in a well known manner to reciprocate the piston rod 121 inwardly and outwardly, carrying the yoke 120 with it. The piston rod has a depending guide element 123 in the form of two prongs that are guided in tracks 124 upstanding oppositely on the bracket 34.

The yoke member 120 straddles the hinge ear elements of the carriers 49 and 50. At its outer end it has pivoted links 125 that extend into the angular openings 81 of the carriers. Eccentric hinge pins 126 (Figs. 8 and 9) extend up through the openings 82 to engage the links 125. These eccentric pins 126 are retained by threaded engagement with link plates 127, the latter in turn being secured to the respective hanger portions 55 and 56 by means of screws 128. As is apparent from Fig. 8, each eccentric pin 126 is rotatable in the opening 82 and, by virtue of the eccentric engagement of the links 125 therewith, serves to adjust the individual carriers 49 and 50 relative to the yoke 120. A jamb nut 129 is provided for maintaining the adjustment.

Operation

In the operation of the mold carrier assembly 30, power from the pneumatic motor 45 causes reciprocation of the yoke 120. When the mold is open, as shown in Fig. 2, the yoke 120 is drawn backwardly, which motion is transmitted through the links 125 to pivot the carriers 49 and 50 away from each other and thereby to separate the mold sections. When the yoke is driven forward, force will be transmitted through the links 125 to pivot the carriers 49 and 50 toward each other, thereby closing the mold sections upon one another. The mold sections are shown in closed position in Fig. 1.

It will be noted that the removal of a mold section from the adapter which supports it in the assembly 30 may be effected simply by lifting it vertically to disengage the complementary arcuate lugs 100 and 108, after which another mold section having similar external dimensions may be substituted. It will further be noted that the engagement of the adapter with the mold extends over a substantial arc which, in addition to the registering function of the screws 101 or 115, insures a proper uniform abutment of the interfaces of the mold sections as they are brought together. The embracing engagement of the inner surfaces of the adapters with the outside of the mold sections further minimizes the tendency of the mold sections to warp under the influence of the intense heat to which they are subjected during the formation of glass articles from molten glass.

When the mold is to be opened, the yoke 120 is retracted and, again, acting through the links 125, causes the carriers 49 and 50 and the adapters attached thereto to pivot away from each other and thereby to separate the mold sections. The mold sections are drawn arcuately apart and are prevented from rotating in their mountings by the cooperation of the notches 109 with the screws 101 or 115. This clean separation of the mold sections avoids displacement of the molded article produced therein, and hence avoids any distortion of the ware that might result from such displacement.

The use of frictionless bearings for the carriers 49 and 50, such as the ball bearing assemblies 60, effectively overcomes the previously troublesome tendency of the carriers to deform under the influence of heat, with consequent binding in their pivotal movement.

Clearly, the above described mold carrier assembly fulfills the objects and advantages sought therefor. It will be understood that the foregoing description is meant to be illustrative and not limitative, the scope of the present invention being limited only by the claims which follow.

What is claimed is:

1. A pivotal mounting for paired elements each having coaxially spaced mounting ears adapted for alternate coaxially spaced disposition, said pivotal mounting comprising a base, a pin upstanding from the base, a frictionless bearing in each ear, each of said bearings comprising an outer ring-like element secured in its respective ear and an inner ring-like element snugly slidable on the pin, and means mounted on the pin so as to engage at least two of the said inner ring-like elements for maintaining clearance between each pair of adjacently disposed ears.

2. In a mold carrier assembly, a mold section carrier comprising a hanger portion and means for pivotably mounting the same, a vertical surface on the hanger portion, an adapter removably secured to the vertical surface, a vertical arcuate surface on the adapter, arcuate lug means on the adapter adjacent the top of the vertical arcuate surface, a mold section having a vertical arcuate outside surface, and means including depending lug means on the mold section for supporting the latter on the adapter with the said vertical arcuate surfaces in substantially flush abutment.

3. In a mold carrier assembly, a mold section carrier comprising a hanger portion and means for pivotably mounting the same, a vertical surface on the hanger portion, an adapter removably secured to the vertical surface, a vertical arcuate surface on the adapter, arcuate lug means on the adapter adjacent the top of the vertical arcuate surface, a mold section having a vertical arcuate outside surface, means including depending lug means on the mold section for supporting the latter on the adapter with the said vertical arcuate surfaces in substantially flush abutment, and means including a notch in said depending lug means for registering the mold section relative to the hanger portion.

4. In a mold carrier assembly, a mold section having upper and lower semi-cylindrical outside surfaces, the radius of the upper of said surfaces being greater than the radius of the lower of said surfaces, a depending lug spaced radially from the lower surface, a support for the mold section, said support having an upstanding lug for engagement with the depending lug and a concave surface for embracing engagement with the lower surface, interfitting means on the mold section and the support for registering the former on the latter, and means for moving the support from one position to another position and returning it to the one position.

References Cited in the file of this patent

UNITED STATES PATENTS

| Number | Name | Date |
| --- | --- | --- |
| 179,409 | Hopkins | July 4, 1876 |
| 1,827,698 | Benoit | Oct. 13, 1931 |
| 2,538,822 | Winder | Jan. 23, 1951 |
| 2,627,626 | Crile | Feb. 10, 1953 |

FOREIGN PATENTS

| 443,052 | Germany | Apr. 16, 1927 |